United States Patent
Manitiu et al.

(10) Patent No.: US 9,879,125 B2
(45) Date of Patent: Jan. 30, 2018

(54) THERMOPLASTIC POLYURETHANE FOAMED ARTICLES COMPRISING A THERMOPLASTIC POLYURETHANE COMPOSITION AND AN EPOXY, FUNCTIONAL STYRENE ACRYLIC COPOLYMER

(71) Applicant: BASF SE, Ludwigshafen (DE)

(72) Inventors: Mihai Manitiu, Macomb, MI (US); Guenter Scholz, Brownstown Township, MI (US); Brad Martin, Dearborn, MI (US); Guido Bilges, Stemwede (DE); DianJun Chen, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/037,490

(22) PCT Filed: Nov. 20, 2014

(86) PCT No.: PCT/US2014/066550
§ 371 (c)(1),
(2) Date: May 18, 2016

(87) PCT Pub. No.: WO2015/077415
PCT Pub. Date: May 28, 2015

(65) Prior Publication Data
US 2016/0280875 A1    Sep. 29, 2016

Related U.S. Application Data

(60) Provisional application No. 61/906,603, filed on Nov. 20, 2013.

(51) Int. Cl.
*C08J 9/00* (2006.01)
*C08L 75/08* (2006.01)
*C08G 101/00* (2006.01)

(52) U.S. Cl.
CPC .............. *C08J 9/0061* (2013.01); *C08L 75/08* (2013.01); *C08G 2101/00* (2013.01); *C08J 2201/022* (2013.01); *C08J 2205/044* (2013.01); *C08J 2300/22* (2013.01); *C08J 2375/04* (2013.01); *C08J 2375/08* (2013.01); *C08J 2425/08* (2013.01); *C08J 2425/14* (2013.01); *C08L 2203/14* (2013.01); *C08L 2207/04* (2013.01)

(58) Field of Classification Search
CPC ............... C08G 2101/00; C08J 9/0061; C08J 2201/022; C08J 2205/044; C08J 2300/22; C08J 2375/04; C08J 2375/08; C08J 2425/08; C08J 2425/14; C08L 53/025; C08L 75/04; C08L 75/08; C08L 2203/14; C08L 2207/04

See application file for complete search history.

(56) References Cited

U.S. PATENT DOCUMENTS

| | | | | |
|---|---|---|---|---|
| 4,749,743 A | * | 6/1988 | Ambrose | ............... C08G 18/10 525/123 |
| 6,984,694 B2 | | 1/2006 | Blasius, Jr. et al. | |
| 2003/0220061 A1 | | 11/2003 | Prasad | |
| 2004/0054023 A1 | | 3/2004 | Kaneda et al. | |
| 2005/0271882 A1 | * | 12/2005 | Walther | ............... C08F 255/02 428/423.1 |
| 2006/0258831 A1 | | 11/2006 | Barksby et al. | |
| 2010/0222242 A1 | | 9/2010 | Prissok et al. | |
| 2011/0257285 A1 | | 10/2011 | Barriau et al. | |

FOREIGN PATENT DOCUMENTS

| FR | 2 963 353 A1 | 2/2012 |
|---|---|---|
| JP | 2009-120688 A | 6/2009 |
| WO | WO 2004/067629 A1 | 8/2004 |

OTHER PUBLICATIONS

International Search Report for Application No. PCT/US2014/066550 dated Dec. 13, 2015, 4 pages.
English language abstract and machine-assisted English translation for FR 2 963 353 extracted from espacenet.com database on May 25, 2016, 13 pages.
English language abstract and machine-assisted English translation for JP 2009-120688 extracted from espacenet.com database on May 25, 2016, 19 pages.
BASF, "Technical Data Brochure—More Sustainable Plastics, Better Environment: Joncryl Functional Additives", Apr. 2010, pp. 1-16.
Database WPI, Week 200941, Thomson Scientific, London, GB; AN 2009-J89559, XP002734793.

\* cited by examiner

*Primary Examiner* — John Cooney
(74) *Attorney, Agent, or Firm* — Armstrong Teasdale LLP

(57) ABSTRACT

A thermoplastic polyurethane foamed article has a plurality of bubbles distributed throughout the thermoplastic polyurethane foamed article and comprises a thermoplastic polyurethane composition and an epoxy-functional styrene acrylic copolymer which are foamed in the presence of a blowing agent. The epoxy-functional styrene acrylic copolymer is present in an amount ranging from 0.1 to 5% of the total combined weight of the thermoplastic polyurethane composition and the epoxy-functional styrene acrylic copolymer. The thermoplastic polyurethane foamed article has an average diameter of the plurality of bubbles ranging from 50 to 120 μm with at least 75% of the plurality of bubbles having a diameter of less than 200 μm.

17 Claims, 6 Drawing Sheets

THERMOPLASTIC POLYURETHANE FOAMED ARTICLES COMPRISING A THERMOPLASTIC POLYURETHANE COMPOSITION AND AN EPOXY, FUNCTIONAL STYRENE ACRYLIC COPOLYMER

CROSS-REFERENCE TO RELATED APPLICATIONS

This application is the National Stage of International Patent Application No. PCT/US2014/066550, filed on Nov. 20, 2014, which claims priority to and all the advantages of U.S. Provisional Patent Application No. 61/906,603, filed on Nov. 20, 2013, the content of which is incorporated herein by reference.

BACKGROUND OF THE INVENTION

1. Field of the Invention

The subject invention generally relates to foamed thermoplastic polyurethane foamed articles, and more particularly to thermoplastic polyurethane articles comprising a thermoplastic polyurethane composition and an epoxy-functional styrene acrylic copolymer.

2. Description of the Related Art

Foaming thermoplastic polyurethane (TPU) compositions is a challenge due to the need for good melt strength to maintain bubbles and due to the flowability of TPU composition during the foaming process. In many instances, the bubbles can collapse as the TPU foam expands upon depressurization, leading to thermoplastic polyurethane foamed articles having high densities and substandard part quality.

As such, there is a need for thermoplastic polyurethane foamed articles having reduced bubble collapse and associated improved part quality.

SUMMARY OF THE INVENTION AND ADVANTAGES

The subject invention provides a thermoplastic polyurethane foamed article comprising a thermoplastic polyurethane composition and an epoxy-functional styrene acrylic copolymer foamed in the presence of a blowing agent. The thermoplastic polyurethane foamed article has a plurality of bubbles distributed throughout the thermoplastic polyurethane foamed article and has an average diameter of the plurality of bubbles that ranges from 50 to 120 μm with at least 75% of the plurality of bubbles having a diameter of less than 200 μm.

The thermoplastic polyurethane composition of the thermoplastic polyurethane foamed article has a durometer hardness ranging from 30 A to 75 D and the epoxy-functional styrene acrylic copolymer is present in an amount ranging from 0.1 to 5% of the total combined weight of the thermoplastic polyurethane composition and the epoxy-functional styrene acrylic copolymer.

The present invention also provides a method for forming the thermoplastic polyurethane foamed article comprising mixing the epoxy-functional styrene acrylic copolymer with the thermoplastic polyurethane composition; melting the mixture of the thermoplastic polyurethane composition and the epoxy-functional styrene acrylic copolymer, and foaming the melted mixture in the presence of the blowing agent.

The thermoplastic polyurethane foamed articles in accordance with the present invention have reduced voids and a more consistent and uniform bubble size and distribution throughout the formed article at a decreased density, and hence improved part quality, as compared with thermoplastic polyurethane foamed articles formed from the same thermoplastic polyurethane composition, under the same processing conditions, but lacking the epoxy-functional styrene acrylic copolymer.

BRIEF DESCRIPTION OF THE DRAWINGS

Other advantages of the present invention will be readily appreciated, as the same becomes better understood by reference to the following detailed description, when considered in connection with the accompanying drawings.

DETAILED DESCRIPTION OF THE INVENTION

Figure 1:
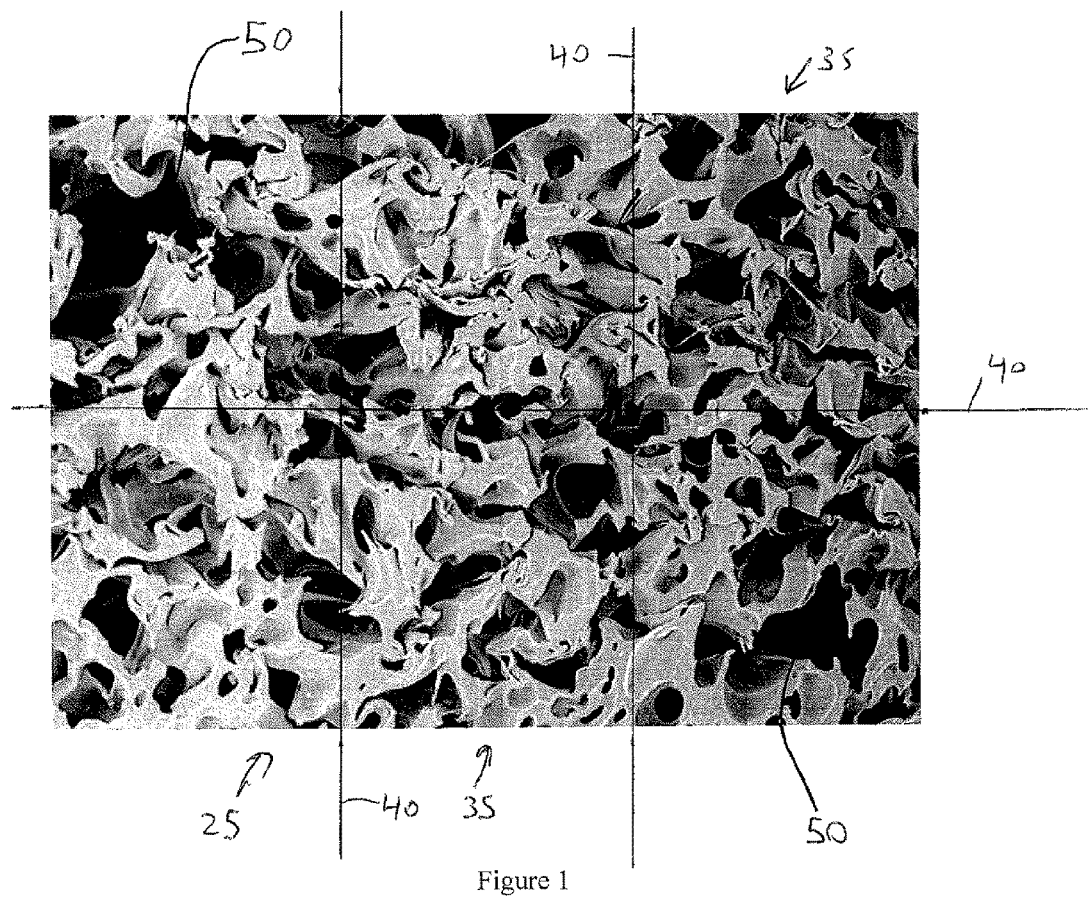
FIG. 1 a scanning electron micrograph, at 50 times magnification, of the thermoplastic polyurethane article of Sample 1 of the Examples.
Figure 2:
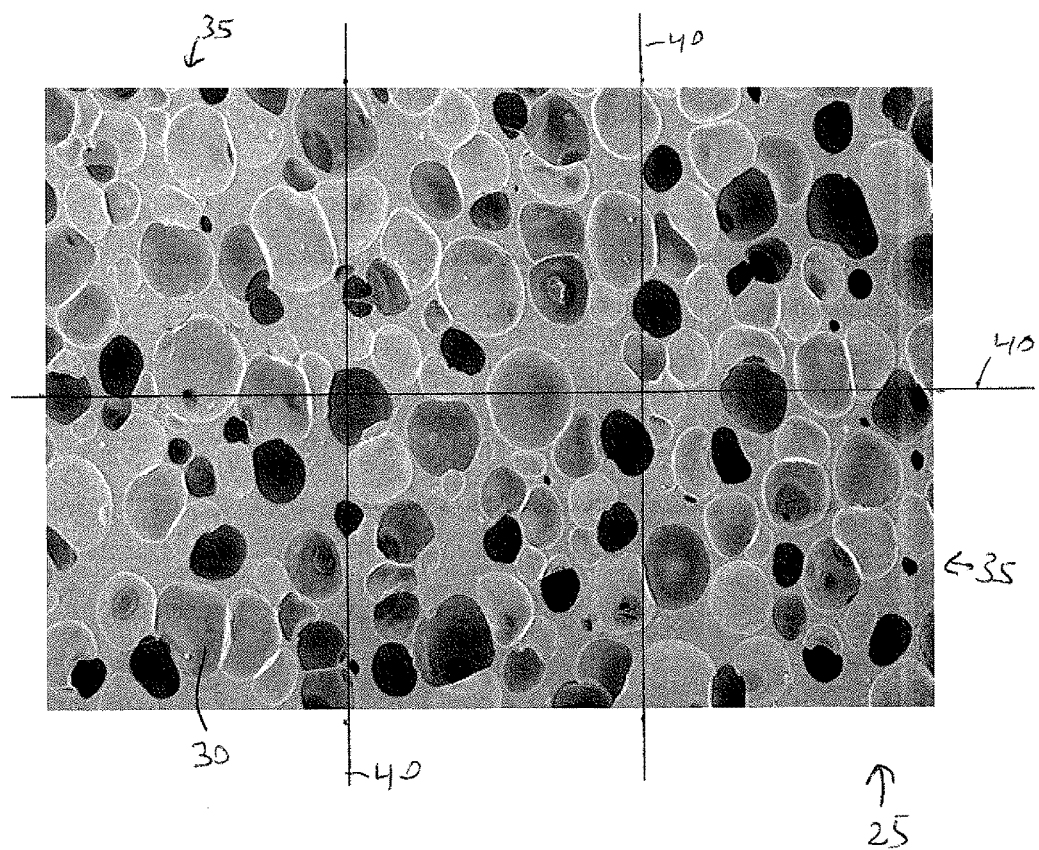
FIG. 2 is a scanning electron micrograph, at 50 times magnification, of the thermoplastic polyurethane article of Sample 1C of the Examples.
Figure 3:
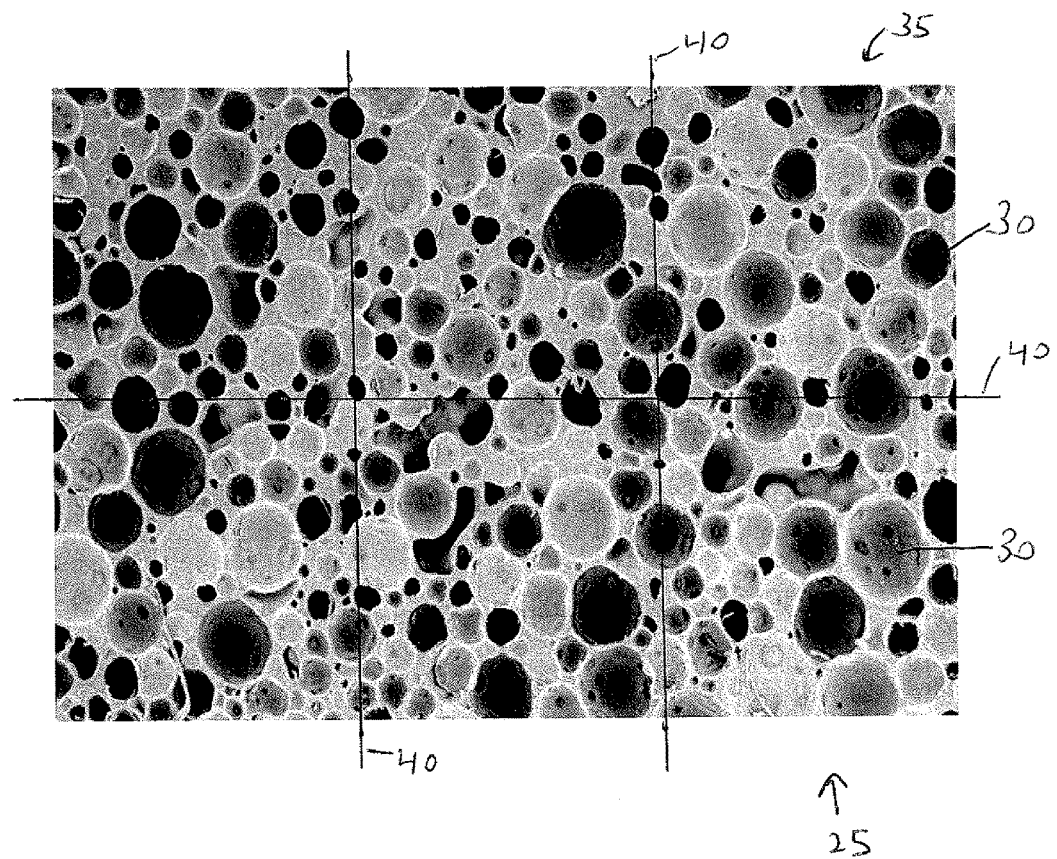
FIG. 3 scanning electron micrograph, at 50 times magnification, of the thermoplastic polyurethane article of Sample 1F of the Examples.

The subject invention generally relates to thermoplastic polyurethane foamed articles having reduced bubble collapse.

The thermoplastic polyurethane foamed article 25 of the present invention, as represented by Samples 1C, 1F, 2B and 2E of the Examples (see FIGS. 2, 3, 5 and 6), define a three dimensional structure having a plurality of interconnected sections 35 that further define an exterior region and an interior region. The interconnected sections 35 are three dimensional in nature and can have any predefined length, width, height or shape, and are thus not confined to the illustrations of FIGS. 1-6 provided herein. Each of the interconnected sections 35 shares a border 40 with the next adjacent interconnected section 35. The thermoplastic polyurethane foamed article 25 includes a plurality of bubbles 30 distributed throughout the thermoplastic polyurethane foamed article 25. More preferably, the plurality of bubbles 30 are distributed throughout each of the interconnected sections 35 of the three dimensional structure.

The term "distributed", in the context of "having a plurality of bubbles 30 distributed throughout the thermoplastic polyurethane foamed article 25", refers to the relative location of the plurality of bubbles 30 contained within the three-dimensional structure of the thermoplastic polyurethane foamed article 25. The term "throughout" as in "distributed throughout" therefore refers to wherein at least one or more of the plurality of bubbles 30 are located within each of the respective interconnected sections 35 of the three-dimensional structure of the thermoplastic polyurethane foamed article 25. Stated another way, there are no interconnected sections 35 of the three-dimensional structure of the thermoplastic polyurethane foamed article 25 that do not include at least one or more of the bubbles 30 of the plurality.

Figure 4:
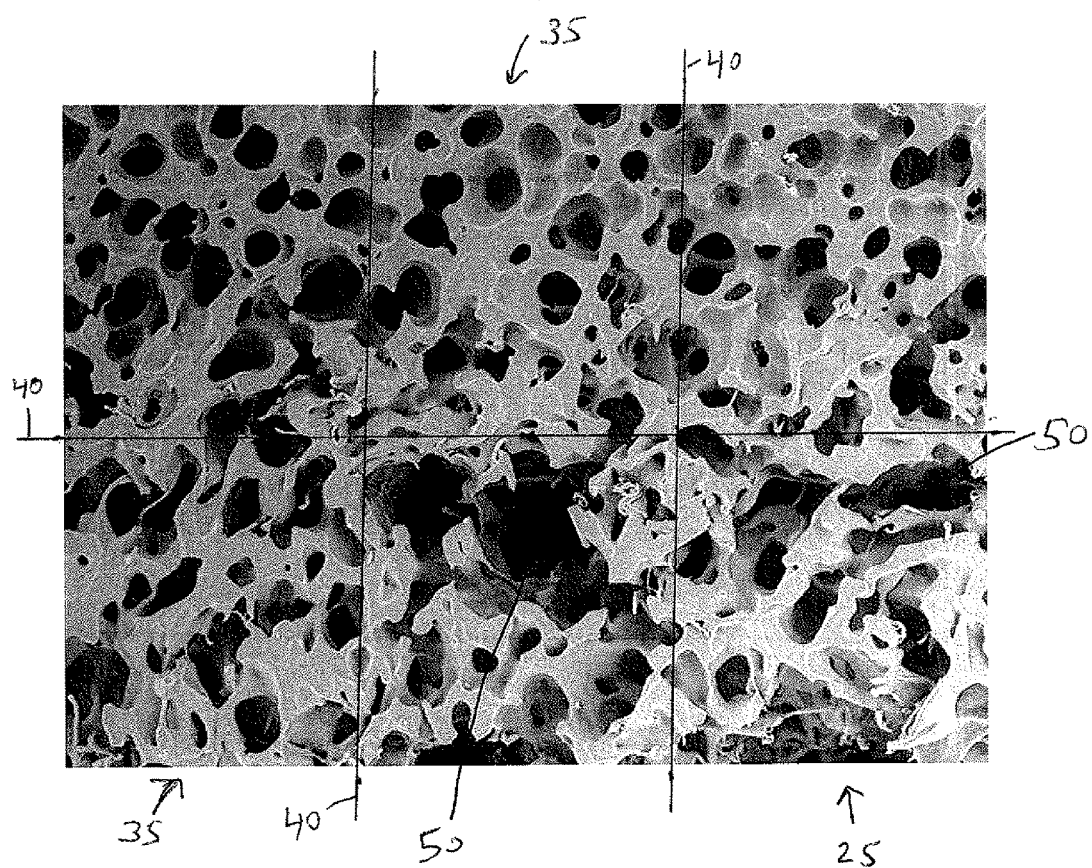
FIG. 4 scanning electron micrograph, at 50 times magnification, of the thermoplastic polyurethane article of Sample 2 of the Examples.
Figure 5:
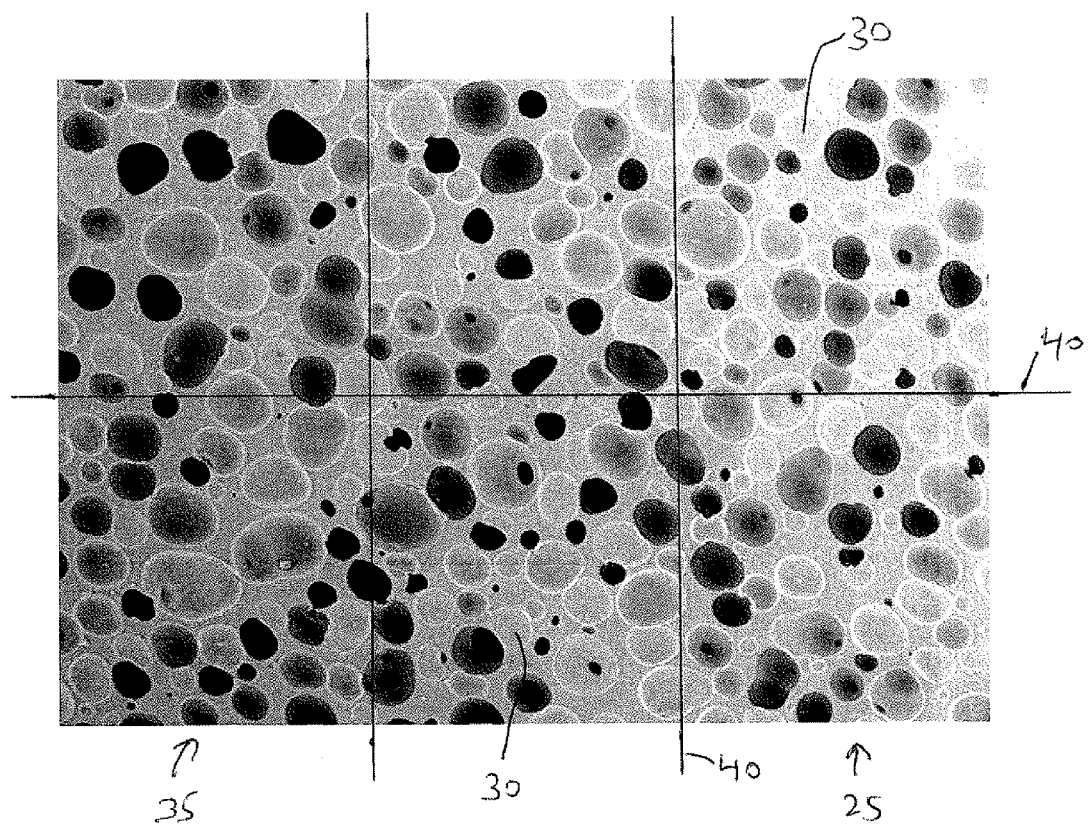
FIG. 5 scanning electron micrograph, at 50 times magnification, of the thermoplastic polyurethane article of Sample 2B of the Examples.
Figure 6:
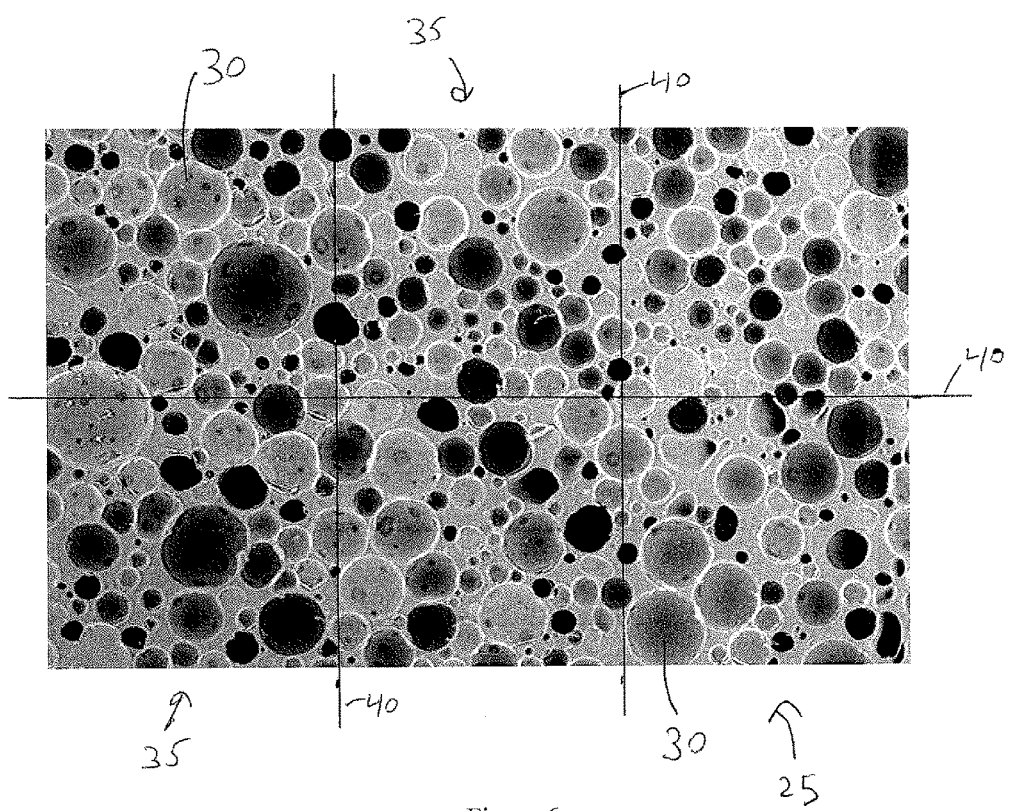
FIG. 6 scanning electron micrograph, at 50 times magnification, of the thermoplastic polyurethane article of Sample 2E of the Examples.

Further, the plurality of bubbles 30 may generally be referred to as being evenly distributed throughout the thermoplastic polyurethane foamed article 25 within each of the interconnected sections 35, and wherein there are relatively few or no voids resulting from bubble collapse within any of those interconnected sections 35 of the three-dimensional structure of the article 25. For comparative purposes, FIGS. 1 and 4 illustrate thermoplastic foamed articles not formed in accordance with the present invention that each include a number of voids 50 contained within one or more of the interconnected sections 35. The term "evenly", as in "evenly distributed", defines wherein a similar number of the plurality of bubbles 30 are located within each of the interconnected sections 35. The term "evenly distributed" is not intended to mean that each interconnected section 35 includes the same number of bubbles 30, nor that the plurality of bubbles 30 within any or all of the interconnected sections are the same size or precisely spaced relative to one another.

Little or no bubble collapse, as defined herein, refers to the absence or substantial absence of large voids within the three-dimensional structure of the thermoplastic polyurethane foamed article 25, such as within any of the interconnected sections 35, which result from the collapse of the formed bubbles 30 during the formation of the thermoplastic polyurethane foamed article 25. As noted above, FIGS. 2, 3, 5 and 6 illustrate four exemplary, non-limiting examples of thermoplastic polyurethane foamed articles 25 formed in accordance with the present invention having a plurality of bubbles 30 evenly distributed throughout each of the interconnected sections 35 and having little or no bubble collapse (i.e., the substantial absence or absence of voids).

The thermoplastic polyurethane foamed article of the present invention comprises a thermoplastic polyurethane composition and an epoxy-functional styrene acrylic copolymer foamed in the presence of a blowing agent.

The term "thermoplastic polyurethane" (TPU), as used with respect to "thermoplastic polyurethane composition" and "thermoplastic polyurethane foamed article", refers to a multi-phase block copolymer created when a polyaddition reaction occurs between an isocyanate and an isocyanate-reactive component. TPUs are generally known as being soft and processable when heated, hard when cooled, and capable of being reprocessed multiple times without losing structural integrity.

Typical thermoplastic polyurethane compositions are made from an isocyanate-reactive component and generally an equivalent amount of an isocyanate. Stated another way, the thermoplastic polyurethane compositions are the reaction product of the isocyanate-reactive component and the isocyanate.

The isocyanate-reactive component includes a polyol. The polyol is generally a polyether polyol or a polyester polyol or caprolactone or combinations thereof. TPUs formed from polyether polyols are generally be referred to as polyether TPUs. Similarly, TPUs formed from polyester polyols are generally be referred to as polyester TPUs, while TPUs formed from caprolactone are generally be referred to as polycaprolactone TPUs.

In addition to the polyol, the isocyanate-reactive component typically also includes a chain extender such as a diol. Stated another way, the thermoplastic polyurethane compositions of the present invention are typically the reaction product of the polyol, the chain extender and the isocyanate.

The thermoplastic polyurethane composition formed from the reaction product of the polyol, the chain extender and the isocyanate includes linear polymeric chains in block-structures. Such chains contain low polarity segments which are rather long (called soft segments), alternating with shorter, high polarity segments (called hard segments). Both types of segments are linked together by covalent bonds, so that the segments actually form block-copolymers. The soft segments, formed via the reaction of the polyol and the isocyanate, provide flexibility to the TPU. The hard segments, formed via the reaction of the chain extender and the isocyanate, provide the TPU with toughness and other physical performance properties. The selection and relative proportions of the polyol, the chain extender, and the isocyanate impact the physical properties of the resultant thermoplastic polyurethane composition and any foamed article formed therefrom in terms of hardness, tensile strength, tear strength, compression set, abrasion resistance, and shrinkage and other properties such as chemical resistance.

It is to be appreciated that one or more isocyanates can be reacted with the isocyanate-reactive component to form the thermoplastic polyurethane composition. It is also to be appreciated that the isocyanate is not limited to any particular genus of isocyanate, e.g. the isocyanate can include monomeric isocyanate, polymeric isocyanate, and mixtures thereof. In addition, the isocyanate can include prepolymers, e.g. polyols reacted with excess isocyanate. Typically, the isocyanate comprises methylene diphenyldiisocyanate (MDI), such as 2,4'-MDI and 4,4'-MDI. Alternatively, the isocyanate may comprise toluene diisocyanate (TDI) (such as 2,4'-TDI or 2,6'-TDI), 1,5-naphthalene diisocyanate (NDI), p-phenylene diisocyanate (PPDI), 1,6-hexamethylene diisocyanate (HDI), cyclohexyl diisocyanate (CHDI), isophorone diisocyanate (IPDI),4,4-dicyclohexylmethane diisocyanate (HMDI), and any combination thereof.

Polyether polyols that are used to produce the thermoplastic polyurethane compositions of the present invention may be made, for example, by reacting an alkylene oxide, such as propylene oxide, with a strong base such as potassium hydroxide, optionally in the presence of water, glycols and the like. Other polyether polyols which can be utilized include, but are not limited to, those which are produced by polymerization of tetrahydrofuran or epoxides such as epichlorohydrin, ethylene oxide, propylene oxide, butylene oxide, styrene oxide, for example in the presence of Lewis catalysts such as boron trifluoride or other suitable initiator compounds, or by the addition of epoxides, optionally mixed or in succession, onto starter components with reactive hydrogen atoms such as water, alcohols, ammonia, or amines. Suitable initiator compounds contain a plurality of active hydrogen atoms, and include, but are not limited to, water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or tri-functional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

The polyester polyols that may be used to form the thermoplastic polyurethane compositions may be formed, for example, from the condensation of one or more polyhydric alcohols with one or more polycarboxylic acids. Examples of suitable polyhydric alcohols include, but are not limited, to the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monallyl ether; glycerol monoethyl ether, diethylene glycol; 2-ethylhexanediol-1,4; cyclohexanediol-1,4; 1,2,6-hexanetriol; 1,3,5-hexanetriol; 1,3-bis-(2-hydroxyethoxy) propane, 1,4- and 2,3-butylene glycol, neopentyl glycol, 1,4-bis-(hydroxymethyl)cyclohexane, trimethylolethane, together with di-, tri-, tetra-, and higher polyethylene glycols, di- and higher polypropylene glycols, together with di- and higher polybutylene glycols, and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides such as tetrahydrophthalic anhydride, hexahydrophthalic anhydride, tetrachlorophthalic anhydride, endomethylenetetrahydrophthalic anhydride, acid chlorides and acid esters such as phthalic anhydride, phthaloyl chloride and the dimethyl ester of phthalic acid, dimerized and trimerized unsaturated fatty acids, optionally mixed with monomeric unsaturated fatty acids, terephthalic acid monomethyl ester and terephthalic acid monoglycol ester.

The chain extender used to form the thermoplastic polyurethane composition according to the present invention suitably comprises compounds having 2 or more active hydrogens and molecular weights ranging from 60 g/mol to 400 g/mol, such as from 60 g/mol to 200 g/mol. Suitable chain extenders having 2 or more active hydrogens include, for example, polyols such as 1,4-butanediol, ethylene glycol, diethylene glycol, propylene glycol, 1,4-butylene glycol, 1,5-pentylene glycol, methylpentanediol, 1,6-hexylene glycol, neopentyl glycol, trimethylolpropane, hydroquinone ether alkoxylate, resorcinol ether alkoxylate, glycerol, pentaerythritol, diglycerol, dextrose, and a 1,4:3,6 dianhydrohexitol such as isomannide; isosorbide and isoidide; aliphatic polyhydric amines such as ethylenediamine, hexamethylenediamine, and isophorone diamine; and aromatic polyhydric amines such as methylene-bis(2-chloroaniline), methylenebis(dipropylaniline), diethyl-toluenediamine, trimethylene glycol di-p-aminobenzoate; alkanolamines such as diethanolamine, triethanolamine and diisopropanolamine.

In certain embodiments, the chain extender is a diol, such as the one or more diols from the list as provided above. If higher functional polyols, such as triols, are included in the reaction product, they are typically introduced in combination with the diols as provided above and in low relative amounts to limit crosslinking and prevent the resultant thermoplastic polyurethane composition from becoming too brittle.

The thermoplastic polyurethane compositions that are utilized in the present invention have a durometer hardness ranging from a Shore A hardness of 30 to a Shore D hardness of 75, such as from a Shore A hardness of 50 to a Shore D hardness of 60, such as from a Shore A hardness of 70 to a Shore D hardness of 90. The "Shore hardness" of the thermoplastic polyurethane composition refers to an empirical measurement used to test the composition's resistance to indentation or penetration under a defined force. Shore A measurements are typically performed upon more flexible types of thermoplastic polyurethane compositions, while Shore D measurements refer to more rigid grades. On both scales, the measurements range from zero to 100 with zero being very soft and 100 very hard. The measurements are performed using a durometer in accordance with the standards provided in ASTM D2240.

The relative amounts and chemical structures of each of the components comprising the isocyanate-reactive component, as well as the structure of the isocyanates, as noted above, may vary in relative amount so long as the thermoplastic polyurethane composition formed therefrom achieves a durometer hardness ranging from a Shore A hardness of 30 to a Shore D hardness of 75.

Suitable thermoplastic polyurethane compositions of the present invention having a durometer hardness ranging from a Shore A hardness of 30 to a Shore D hardness of 75 that may be used in the present invention include those commercially available from BASF Corporation of Florham Park, N.J. and sold under the trade name Elastollan®.

The blowing agent of the present invention may be a physical blowing agent, a chemical blowing agent, or a combination of a physical blowing agent and chemical blowing agent.

The terminology "physical blowing agent" refers to blowing agents that do not chemically react with the isocyanate and/or the isocyanate-reactive component of the thermoplastic polyurethane composition. The physical blowing agent can be a gas or liquid.

In certain embodiments, the physical blowing agent can also be a gas that is trapped within a thermoplastic shell, wherein the gas expands under heat which causes the shell to grow. The thermoplastic shell, in certain embodiments, may comprise a styrenic polymer.

In certain embodiments, the physical blowing agent may be introduced via a masterbatch containing both the physical blowing agent and a polymer matrix composition such as ethylene vinyl acetate (EVA) or a thermoplastic polyurethane composition that is the same or different from the thermoplastic polyurethane compositions as described above. In these embodiments, the physical blowing agent concentration in the masterbatch is between 25 and 75 parts by weight based upon the 100 parts by weight of the combination of the physical blowing agent and the polymer matrix composition.

The liquid physical blowing agent, in certain embodiments, evaporates into a gas when heated, and typically returns to a liquid when cooled. In certain embodiments, the liquid physical blowing agent is a liquefied gas such as liquefied carbon dioxide or liquid nitrogen. In certain embodiments, the liquefied gas is incorporated directly into the thermoplastic polyurethane composition after it is melted, as described further below.

The blowing agent is typically introduced to the thermoplastic polyurethane composition in an amount of from about 0.125 to about 15 parts by weight, such as from 4 to 6 parts by weight, based on 100 parts by weight of the combined weight of the polyol present in the isocyanate-reactive component and the blowing agent.

The terminology "chemical blowing agent" refers to blowing agents which chemically react to release a gas for foaming. In certain embodiments, the chemical blowing agent chemically reacts with the isocyanate and/or the isocyanate-reactive component of the thermoplastic polyurethane composition. One specific, non-limiting example of a chemical blowing agent is water, which reacts with the isocyanate to create carbon dioxide. Other non-limiting examples of chemical blowing agents include citric acid or hydrogen carbonate which can also create carbon dioxide.

The chemical blowing agent is typically introduced to the thermoplastic polyurethane composition in an amount such that, after reaction, the resultant blowing agent comprises from about 0.125 to about 15 parts by weight, such as from 4 to 6 parts by weight, based on 100 parts by weight of the combined weight of the polyol present in the isocyanate-reactive component and the blowing agent.

The thermoplastic polyurethane compositions also include an epoxy-functional styrene acrylic copolymer present in an amount up to 5% of the total combined weight of the thermoplastic polyurethane composition and the epoxy-functional styrene acrylic copolymer. More preferably, the epoxy-functional styrene acrylic copolymer is present in an amount from 0.1 to 5%, such as from 0.1 to 3%, such as from 1 to 3%, of the total combined weight of the thermoplastic polyurethane composition and the epoxy-functional styrene acrylic copolymer.

Without intending to be bound by any theory, the inclusion of the epoxy-functional styrene acrylic copolymer, included an amount up to 5% of the total combined weight of the thermoplastic polyurethane composition and the epoxy-functional styrene acrylic copolymer, increases the bubble strength of the thermoplastic polyurethane composition prior to foaming. Thus, when the thermoplastic polyurethane composition is foamed in accordance with the present invention by depressuring the thermoplastic polyurethane in the presence of the blowing agent, as described in further detail below, the resultant thermoplastic polyurethane foamed article has reduced bubble collapse, and hence increased bubble uniformity and bubble size (in terms of diameter), as compared with thermoplastic polyurethane foamed article formed in the same manner from the same thermoplastic polyurethane composition but lacking the epoxy-functional styrene acrylic copolymer.

Non-limiting exemplary epoxy-functional styrene acrylic copolymers that may be used in the present invention include those commercially available from BASF Corporation of Florham Park, N.J. and sold under the trade name Joncryl®. Two exemplary, non-limiting epoxy-functional styrene acrylic copolymers are Joncryl 4300® and Joncryl 4370®.

Additional optional components may also be added to the thermoplastic polyurethane composition prior to foaming the thermoplastic polyurethane composition to form the thermoplastic polyurethane foamed article. Such additional components include, but are not limited to, waxes, lubricants, ultraviolet light stabilizers, antioxidants, compatibilizers, surfactants, friction modifiers, fillers, crosslinkers, plasticizers, flame retardants, colorants, or any combination thereof.

In addition, other polymers may be blended or otherwise incorporated or introduced with the thermoplastic polyurethane composition and melted to form the foamed thermoplastic foamed article as described above. Such polymers include, but are not limited to, polyethylene, polypropylene, polystyrene including high-impact polystyrene (HIPS), methyl-methacrylate-acrylonitrile-butadiene-styrene (MABS), acrylonitrile-butadiene-styrene (ABS), polyoxymethylene (POM), polybutylene terephthalate (PBT), ethylene vinyl acetate (EVA), or recycled tire rubber.

Still further, other melt strength enhancers that are different than the epoxy-functional styrene acrylic copolymers described above may also be included in the thermoplastic polyurethane composition, such as thermoplastic polyurethane melt strength enhancers including, but not limited to, carbonylbiscaprolactam, phenylenebisoxazine, and phenylenebisoxaxoline. Non-limiting commercially available exemplary thermoplastic polyurethane melt strength enhancer that may be used in conjunction epoxy-functional styrene acrylic copolymers include X-Flex MB 2905 and X-Flex MB 2909, both commercially available from BASF Corporation of Florham Park, N.J. In addition, other forms of epoxy-functional polymers that are different than the epoxy-functional styrene acrylic copolymers and sold under the Joncryl® tradename may also be included in the thermoplastic polyurethane composition.

The present invention also discloses a method for forming a thermoplastic polyurethane foamed article from the thermoplastic polyurethane composition. Specifically, the thermoplastic polyurethane foamed article is formed by melting the thermoplastic polyurethane composition in the presence of the blowing agent and the epoxy-functional styrene acrylic copolymer and then foaming the melted thermoplastic polyurethane composition in the presence of the blowing agent. The melting step is such that the blowing agent impregnates the melted thermoplastic polyurethane composition, causing bubbles to form therein. The epoxy-functional styrene acrylic copolymer is believed to increase the strength of the bubbles formed in this process. The melted thermoplastic polyurethane composition is then foamed in the presence of the blowing agent to form the thermoplastic polyurethane foamed article. The foaming of the melted thermoplastic polyurethane composition is the result of a pressure drop, or depressurization, of melted thermoplastic polyurethane composition, which causes thermoplastic polyurethane composition to expand and form the thermoplastic polyurethane foamed article Next, optionally, the thermoplastic polyurethane foamed article may be cured by heating the article for a period of time sufficient to cure the thermoplastic polyurethane foamed article. Alternatively, the thermoplastic polyurethane foamed article is allowed to remain at ambient temperatures for a period of time sufficient to achieve ambient cure of the thermoplastic polyurethane foamed article.

In one preferred method for forming the thermoplastic polyurethane foamed article of the present invention, the thermoplastic polyurethane composition, the epoxy-functional styrene acrylic copolymer and blowing agent and other optional ingredients, as described above, are introduced into a processing device, such as an extruder, and preferably a single screw extruder. The processing device is heated to a temperature sufficient to melt the thermoplastic polyurethane composition, and, in the case of an extruder, the melted material is compressed and mixed. Further, in the case of an extruder, the melting may occur in stages in multiple heating zones. Gas formed from the evaporation of the liquid physical blowing agent during the heating process, or from the chemical reaction of the chemical blowing agent in the heating process, or otherwise generated or present from the blowing agent is impregnated within the melted thermoplastic polyurethane composition to form bubbles as a result of the pressure increase associated with the heating step.

Next, the thermoplastic polyurethane foamed article is formed by releasing the melted thermoplastic polyurethane composition from the reaction vessel. The pressure drop, or depressurization, associated with releasing the melted thermoplastic polyurethane composition from the processing device (having a higher pressure) causes the bubbled thermoplastic polyurethane composition to expand and form the thermoplastic polyurethane foamed article.

In certain embodiments, wherein an extruder is used to melt the thermoplastic polyurethane composition, the thermoplastic polyurethane foamed article is produced by releasing the melted thermoplastic polyurethane composition impregnated with the gas from the blowing agent through a die opening in the extruder and onto a rolling conveyor belt. The size of the die opening and speed of the conveyor, as well as the force applied to push the melted thermoplastic polyurethane composition through the die opening (as controlled by the die geometry and draw down ratio), can be controlled to determine the thickness of the thermoplastic polyurethane foamed article formed. This is known to those of ordinary skill in the foaming art as a continuous process for forming the thermoplastic polyurethane foamed article.

Alternatively, wherein an extruder is used to melt the thermoplastic polyurethane composition in conjunction with an injection molding apparatus, the thermoplastic polyurethane foamed article is produced by releasing the melted thermoplastic polyurethane composition impregnated with the gas from the blowing agent into the injection molding apparatus having an internal cavity of a predetermined size. The pressure drop within the mold cavity causes the thermoplastic polyurethane composition impregnated with gas to expand to fill the mold cavity. After a period of time, the injection molding apparatus is opened, releasing the thermoplastic polyurethane foamed article.

Next, optionally, the thermoplastic polyurethane foamed article may be cured by introducing the article to a heating device, such as an oven, and heating the article for a period of time sufficient to cure the thermoplastic polyurethane foamed article. Alternatively, the thermoplastic polyurethane foamed article is allowed to remain at ambient temperatures for a period of time sufficient to achieve ambient cure of the thermoplastic polyurethane foamed article.

The resultant thermoplastic polyurethane foamed article, produced in accordance with the methods as described above, have an average diameter of the plurality of bubbles that ranges from 50 to 120 μm, such as from 60 to 115 μm.

In addition, the resultant thermoplastic polyurethane foamed articles in accordance with the present invention are formed wherein at least 75% of the bubbles of the plurality have a diameter of less than 200 μm. In certain of these embodiments, the resultant thermoplastic polyurethane foamed articles in accordance with the present invention are formed wherein at least 80%, or wherein at least 90%, of the bubbles of the plurality have a diameter of less than 200 μm.

In certain of these embodiments, the resultant thermoplastic polyurethane foamed articles in accordance with the present invention are formed wherein virtually all of the bubbles of the plurality have a diameter of less than 500 μm. In certain of these embodiments, the resultant thermoplastic polyurethane foamed articles in accordance with the present invention are formed wherein at least 20% of the bubbles of the plurality have a diameter of less than 100 μm The resultant thermoplastic polyurethane foamed article, produced in accordance with the methods as described above, also have a density ranging from 0.15 to 0.8 g/cm$^3$ (measured at 25° C.), such as from 0.2 to 0.65 g/cm$^3$, such as from 0.25 to 0.5 g/cm$^3$.

Still further, as noted above, the addition of the epoxy-functional styrene acrylic copolymer, in levels from 0.1 to 5% based upon the total combined weight of the epoxy-functional styrene acrylic copolymer and thermoplastic polyurethane composition, is believed to enhance the melt strength for the thermoplastic polyurethane composition in order to achieve good bubble strength during the foaming process with chemical and/or physical blowing agents. Thermoplastic polyurethane foamed articles including the epoxy-functional styrene acrylic copolymer have reduced voids throughout the formed article, and a more consistent and uniform bubble size and distribution throughout the formed article at a decreased density, and hence improved part quality, as compared with thermoplastic polyurethane foamed articles formed from the same thermoplastic polyurethane composition, under the same processing conditions, but lacking the epoxy-functional styrene acrylic copolymer.

In addition, the addition of the epoxy-functional styrene acrylic copolymer, in levels from 0.1 to 5% based upon the total combined weight of the epoxy-functional styrene acrylic copolymer and thermoplastic polyurethane composition allows the thermoplastic polyurethane composition to be processed at high temperatures where the thermoplastic polyurethane composition can flow and fill a mold or cavity while still maintaining good bubble integrity.

EXAMPLES

Thermoplastic polyurethane foamed article test panels, formed from the thermoplastic polyurethane composition of the present invention, were evaluated versus thermoplastic polyurethane foamed article test panels having the same dimensions and formed from the same or similar thermoplastic polyurethane starting compositions but without the epoxy-acrylic styrene copolymer.

Tables 1 and 2 below provide the compositions for the various thermoplastic polyurethane compositions that were evaluated:

TABLE 1

Test Thermoplastic Polyurethane Composition used to form Test Panels 1-1H

| Material | Composition | | | | | | | | | |
|---|---|---|---|---|---|---|---|---|---|---|
| | 1 | 1A | 1AA | 1B | 1C | 1D | 1E | 1F | 1G | 1H |
| Elastollan ® 1180A10[1] | 100% | 100% | 100% | 100% | 100% | 100% | 100% | 100% | 100% | 100% |
| Elastollan ® SP9213[2] | | | | | | | | | | |
| X-Flex MB 2905[3] | | 5% | 2.5% | | | | | | | |

TABLE 1-continued

Test Thermoplastic Polyurethane Composition used to form Test Panels 1-1H

| Material | Composition | | | | | | | | | |
|---|---|---|---|---|---|---|---|---|---|---|
| | 1 | 1A | 1AA | 1B | 1C | 1D | 1E | 1F | 1G | 1H |
| Joncryl ADR 4300[4] | | | | 3% | | | | | | |
| Joncryl ADR 4370[5] | | | | | 3% | 3% | 5% | 3% | 3% | 3% |
| Konz V2893[6] | 5% | 5% | 5% | 5% | 5% | 7.5% | 7.5% | 5% | 8% | 7% |
| Konz V2894[7] | | | | | | | | 5% | 2% | 7% |

[1]Thermoplastic polyurethane commercially available from BASF Corporation of Florham, Park, New Jersey.
[2]Thermoplastic polyurethane commercially available from BASF Corporation of Florham, Park, New Jersey.
[3]Thermoplastic polyurethane melt strength enhancer commercially available from BASF Corporation of Florham, Park, New Jersey.
[4]Epoxy-styrene acrylic copolymer commercially available from BASF Corporation of Florham, Park, New Jersey.
[5]Epoxy-styrene acrylic copolymer commercially available from BASF Corporation of Florham, Park, New Jersey.
[6]Physical blowing agent commercially available from BASF Corporation of Florham, Park, New Jersey.
[7]Physical blowing agent commercially available from BASF Corporation of Florham, Park, New Jersey.

TABLE 2

Test Thermoplastic Polyurethane Composition used to form Test Panels 2-2E

| Material | Composition | | | | | | |
|---|---|---|---|---|---|---|---|
| | 2 | 2A | 2AA | 2B | 2C | 2D | 2E |
| Elastollan ® 1180A10[1] | | | | | | | |
| Elastollan ® SP9213[2] | 100% | 100% | 100% | 100% | 100% | 100% | 100% |
| X-Flex MB 2905[3] | | 2.5% | 2.5% | | | | |
| Joncryl ADR 4300[4] | | | | 3% | | | |
| Joncryl ADR 4370[5] | | | | | 3% | 5% | 3% |
| Konz V2893[6] | 5% | 5% | 10% | 5% | 5% | 5% | 5% |
| Konz V2894[7] | | | | | | | 5% |

The TPU foamed test panels 1-1H and 2-2E were formed from these respective compositions by first introducing each of the components of the thermoplastic polyurethane composition as described in Tables 1 and 2 above (i.e., the test composition) into a Kloeckner FM 160 injection molding machine, which includes an extruder portion, set to the following temperature profile and processing conditions (Zones 1-4 are provided in degrees Celsius):

Injection Molding Machine:
Type: Kloeckner FM 160
Clamping Force: 160 t
Screw: special TPU design
Special feature: hydraulic shut-off nozzle

TABLE 3

| Processing Conditions | |
|---|---|
| Processing Conditions | |
| Zone 1 | 100 |
| Zone 2 | 160 |
| Zone 3 | 185 |
| Zone 4 | 195 |
| T melt (C.) | 180 |
| T mold (C.) | 40 |
| Injection Speed (mm/s) | 120 |
| Pressure (bar) | 68 |
| Cooling time (sec) | 180 |

After introduction, the components of the respective thermoplastic polyurethane composition were mixed and melted within the extruder portion of the Kloeckner FM 160 injection molding machine in the presence of the physical blowing agents. The components of the respective thermoplastic polyurethane composition were processed according to the temperature and pressure profile above to form a melted thermoplastic polyurethane composition having a plurality of bubbles dispersed therewithin. The melted and mixed thermoplastic polyurethane composition was then injected into the interior of the injection mold portion of the Kloeckner FM 160 injection molding machine having a predefined interior size and shape (here 4 inches by 6 inches), with the pressure decrease associated with the injection process causing the thermoplastic polyurethane composition to expand to fill the interior of the injection mold portion to form a foamed test panel. The foamed test panel was held in the interior of the injection mold portion for 20 to 40 seconds at 70-176° F. (40-80° C.). The mold was opened, and the foamed test panel of approximately 4 inches by 6 inches, at a thickness of approximately 0.4 inches, was removed.

The foamed test panels was left at ambient temperature for a period of 1 to 7 days prior to evaluation, wherein the panels were evaluated visually for appearance, with the visual observations summarized in Table 4:

TABLE 4

Visible Observation of Test Panels

| Test Panel | Visible Observations of Test Panel |
|---|---|
| 1 | Many visible voids due to bubbles collapsing especially in the middle of the test panel. Large bubble distribution which was difficult to measure due to bubbles collapsing, breaking and uneven shape. |
| 1A | Some voids |
| 1AA | Some voids |
| 1B | Some visible voids |
| 1C | No voids, bubbles are homogenously distributed through the foamed test sample |
| 1D | Some visible voids |
| 1E | Some visible voids |

TABLE 4-continued

Visible Observation of Test Panels

| Test Panel | Visible Observations of Test Panel |
|---|---|
| 1F | No visible voids |
| 1G | Some visible voids |
| 1H | Some visible voids |
| 2 | Many visible voids due to bubbles collapsing especially in the middle of the test panel. Large bubble distribution which was difficult to measure due to bubbles collapsing, breaking and uneven shape. |
| 2B | No voids, bubbles are homogenously distributed through the foamed test panel. |
| 2C | Very few voids |
| 2D | Few voids under skin |
| 2E | Few voids under skin |

In addition, each of the foamed test panels visually observed as in Table 4 was also evaluated for aspect ratio, length, width, diameter, and number of cells according to the following procedure. First, a small cube cut out of the test panel was cut with a razor blade to produce a cross-section with a flat surface for imaging. The cube was fixed onto an aluminum SEM (Scanning Electron Micrograph) sample stub using a carbon adhesive pad, and was given a light gold coating to reduce surface charging in the electron beam of the scanning electron microscope. (Hummer® 10.2 Sputtering System, Anatech Ltd., In DC Plate Mode, 2400 volts, 3-4 minutes).

Images of the cross-section of the respective cube of each of the test panels were captured at 50× magnification using a Zeiss EVO MA 15 Scanning Electron Microscope (Carl Zeiss SMT) operated at 20 KeV excitation voltage in the variable pressure mode. Samples 1, 1C, 1F, 2, 2B and 2E, as shown in FIGS. 1-6, respectively, illustrate the cross-sectional images described and evaluated and also confirm the visual observations summarized for these respective samples as summarized in Table 4 above.

Backscattered imaging (which produces contrast based on differences in atomic number (Z) with higher-Z elements appearing brighter) was also utilized. The 50× images were adjusted for brightness and contrast using Adobe® Photoshop® software, version 6.0.1 Copyright® 1989-2001 Adobe Systems Inc. and were then processed using Image-Pro® P-L-U-S software, version 5.1.0.20, Copyright® 1993-2004, Media Cybernetics, to produce a grayscale, binary image with a black background.

The adjusted, processed images were processed a second time using Adobe® Photoshop to remove any white pixels inside pore boundaries and to fill gaps in pore boundaries. This produced an image with black pores against a white background. The pores were counted and measured using ImagePro® software using calibrated measuring tools. The measurement data was exported to a template for generation of statistics and bar graph showing pore length distribution. (Microsoft® Excel 2000). The results are summarized in Table 5 below:

TABLE 5

Measured Test Results of Test Panels

| Sample | Roundness* | Length (μm) | Width (μm) | Diameter (μm) | #Cells | # >100 μm | # >200 μm | # >500 μm |
|---|---|---|---|---|---|---|---|---|
| 1 | Unable to determine bubble size due to bubbles collapsing and due to uneven bubbles shape for bubbles that are still intact. | | | | | | | |
| 1A | Unable to determine bubble size due to bubbles collapsing and due to uneven bubbles shape for bubbles that are still intact. | | | | | | | |
| 1AA | Unable to determine bubble size due to bubbles collapsing and due to uneven bubbles shape for bubbles that are still intact. | | | | | | | |
| 1C | 1.31 | 143 | 98 | 115 | 446 | 246 | 77 | 0 |
| 1D | 1.38 | 145 | 90 | 111 | 346 | 148 | 79 | 1 |
| 1E | 1.30 | 87 | 61 | 70 | 491 | 141 | 15 | 0 |
| 1F | 1.18 | 80 | 68 | 71 | 608 | 180 | 12 | 0 |
| 1G | 1.26 | 95 | 75 | 82 | 360 | 117 | 22 | 0 |
| 1H | 1.21 | 72 | 59 | 63 | 488 | 102 | 7 | 0 |
| 2 | Unable to determine bubble size due to bubbles collapsing and due to uneven bubbles shape for bubbles that are still intact. | | | | | | | |
| 2A | Unable to determine bubble size due to bubbles collapsing and due to uneven bubbles shape for bubbles that are still intact. | | | | | | | |
| 2B | 1.16 | 104 | 84 | 91 | 445 | 215 | 13 | 0 |
| 2C | 1.24 | 119 | 84 | 98 | 423 | 223 | 31 | 0 |
| 2D1 | 1.24 | 125 | 90 | 103 | 407 | 249 | 28 | 0 |
| 2E | 1.15 | 73 | 63 | 65 | 413 | 95 | 8 | 0 |

*Roundness = perimeter$^2$ (pi)(area)/4

As Tables 4 and 5 and the associated FIGS. 1-6 confirm, the inclusion of an epoxy-styrene acrylic copolymer, present in an amount ranging from 0.1 to 5% of the total combined weight of the thermoplastic polyurethane composition and the epoxy-functional styrene acrylic copolymer, produced thermoplastic polyurethane foamed test panels wherein the plurality of bubbles have an average diameter ranging from 50 to 120 μm with at least 75% of the bubbles having a diameter of less than 200 μm. Conversely, test panels prepared from the same thermoplastic polyurethane compositions under the same processing conditions, but lacking the epoxy-styrene acrylic copolymer present in an amount ranging from 0.1 to 5% of the total combined weight of the thermoplastic polyurethane composition and the epoxy-functional styrene acrylic copolymer, produced thermoplastic polyurethane foamed test panels having voids or large variations in the bubble size and distribution, resulting in poorer part quality.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, or any range between the endpoints, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. A thermoplastic polyurethane foamed article comprising:
   a thermoplastic polyurethane composition and an epoxy-functional styrene acrylic copolymer foamed in the presence of a blowing agent, the thermoplastic polyurethane composition having a durometer hardness ranging from a Shore A hardness of 30 to a Shore D hardness 75, and the epoxy-functional styrene acrylic copolymer present in an amount ranging from 0.1 to 5% of the total combined weight of the thermoplastic polyurethane composition and the epoxy-functional styrene acrylic copolymer;
   the thermoplastic polyurethane foamed article defining a plurality of bubbles distributed throughout the thermoplastic polyurethane foamed article, the bubbles of the plurality having an average diameter ranging from 50 to 120 μm with at least 75% of the bubbles of the plurality having a diameter of less than 200 μm.

2. The thermoplastic polyurethane foamed article according to claim 1, wherein the epoxy-functional styrene acrylic copolymer is present in an amount from 0.1 to 3% of the total combined weight of the thermoplastic polyurethane composition and the epoxy-functional styrene acrylic copolymer.

3. The thermoplastic polyurethane foamed article according to claim 1, wherein the thermoplastic polyurethane composition has a durometer hardness ranging from a Shore A hardness of 50 to a Shore D hardness of 60.

4. The thermoplastic polyurethane foamed article according to claim 1, wherein the bubbles of the plurality have an average diameter ranging from 65 to 115 μm.

5. The thermoplastic polyurethane foamed article according to claim 1, wherein the thermoplastic polyurethane composition comprises the reaction product of an isocyanate, a diol and at least one compound selected from a polyether polyol, a polyester polyol, a caprolactone and combinations thereof.

6. The thermoplastic polyurethane foamed article according claim 1, wherein the thermoplastic polyurethane foamed article has a density ranging from 0.15 to 0.8 g/cm$^3$ at 25° C.

7. The thermoplastic polyurethane foamed article according claim 1, wherein the bubbles of the plurality are evenly distributed throughout the thermoplastic polyurethane foamed article with little or no bubble collapse.

8. The thermoplastic polyurethane foamed article according to claim 1 defining a three-dimensional structure having a plurality of interconnected sections wherein the bubbles of the plurality are distributed within each of the plurality of interconnected sections with little or no bubble collapse.

9. A method for forming a thermoplastic polyurethane foamed article comprising:
   mixing an epoxy-functional styrene acrylic copolymer and a thermoplastic polyurethane composition having a durometer hardness ranging from a Shore A hardness of 30 to a Shore D hardness 75, wherein the epoxy-functional styrene acrylic copolymer is present in an amount from 0.1 to 5% of the total combined weight of the thermoplastic polyurethane composition and the epoxy-functional styrene acrylic copolymer;
   melting the mixture of the thermoplastic polyurethane composition and the epoxy-functional styrene acrylic copolymer in the presence of a blowing agent; and
   foaming the melted mixture of the thermoplastic polyurethane composition and the epoxy-functional styrene acrylic copolymer in the presence of the blowing agent to form the thermoplastic polyurethane foamed article defining a plurality of bubbles, the bubbles of the plurality having an average diameter ranging from 50 to 120 μm with at least 75% of the bubbles of the plurality having a diameter less than 200 μm.

10. The method according to claim 9, wherein the epoxy-functional styrene acrylic copolymer comprises from 0.1 to 3% of the total combined weight of the thermoplastic polyurethane composition and the epoxy-functional styrene acrylic copolymer.

11. The method according to claim 9, wherein the bubbles of the plurality have an average bubble size ranging from 65 to 115 μm.

12. The method according to claim 9, wherein the thermoplastic polyurethane foamed article has a density ranging from 0.15 to 0.8 g/cm$^3$ at 25° C.

13. The method according claim 9, wherein the thermoplastic polyurethane foamed article defines a three-dimensional structure having a plurality of interconnected sections wherein the bubbles of the plurality are distributed within each of the plurality of interconnected sections with little or no bubble collapse.

14. A thermoplastic polyurethane foamed article formed in accordance with the method of claim 9.

15. The thermoplastic polyurethane foamed article according to claim 2, wherein the thermoplastic polyurethane composition has a durometer hardness ranging from a Shore A hardness of 50 to a Shore D hardness of 60.

16. The thermoplastic polyurethane foamed article according to claim 2, wherein the bubbles of the plurality have an average diameter ranging from 65 to 115 μm.

17. The thermoplastic polyurethane foamed article according to claim 3, wherein the bubbles of the plurality have an average diameter ranging from 65 to 115 μm.

* * * * *